Sept. 13, 1932.  E. T. WUEST  1,876,819
COTTON PREPARING MACHINE
Filed Feb. 21, 1930  3 Sheets-Sheet 1
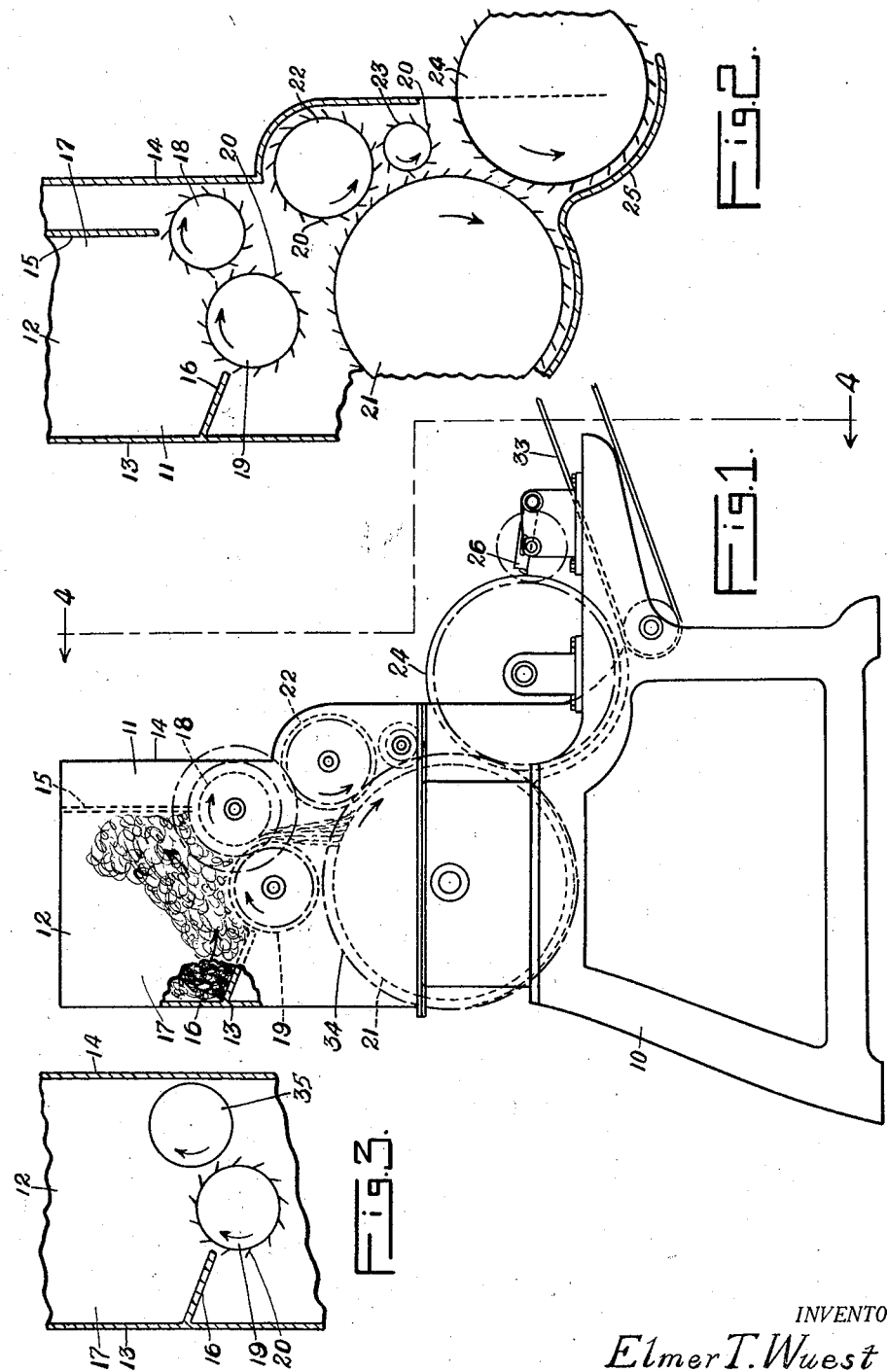
INVENTOR.
Elmer T. Wuest
BY
ATTORNEYS Sept. 13, 1932.  E. T. WUEST  1,876,819
COTTON PREPARING MACHINE
Filed Feb. 21, 1930    3 Sheets-Sheet 2

INVENTOR.
Elmer T. Wuest
BY
ATTORNEYS

Sept. 13, 1932.　　　　E. T. WUEST　　　　1,876,819
COTTON PREPARING MACHINE
Filed Feb. 21, 1930　　　3 Sheets-Sheet 3
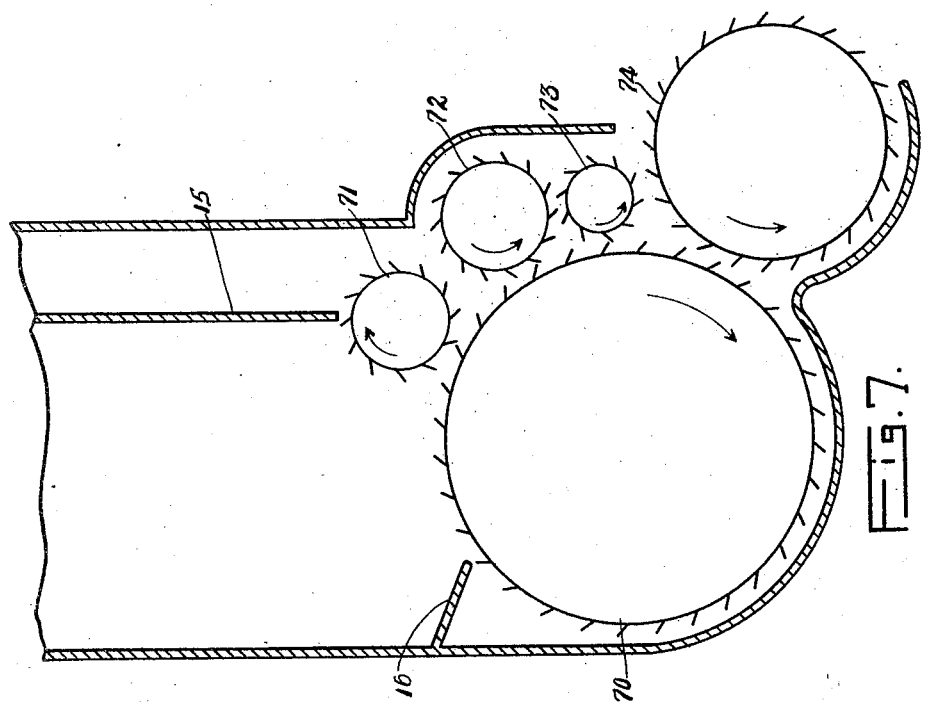
Inventor
Elmer T. Wuest Patented Sept. 13, 1932

1,876,819

UNITED STATES PATENT OFFICE

ELMER T. WUEST, OF CINCINNATI, OHIO

COTTON PREPARING MACHINE

Application filed February 21, 1930. Serial No. 430,220.

This application is a continuation in part of application Serial Number 192,759, filed May 19, 1927.

This invention relates to a device for use in the preparation of fibrous material such as cotton and the like and has for its principal object the provision of a simplified structure wherein one device accomplishes the operations heretofore requiring several machines.

Another object is to provide a device of this kind wherein fewer parts than were formerly used are arranged in a novel manner to the end that the desired results are attained in a different manner.

Another object is to provide a mechanism which is compact in structure and which operates with greater efficiency than heretofore known devices both in production and in the quality of the product.

These and other objects are attained by the means described herein and disclosed in the accompanying drawings, in which:

Fig. 1 is a side elevational view of a device showing the invention, part being broken away and part shown in dotted lines.

Fig. 2 is a fragmental side view of the device, some of the parts being represented diagrammatically.

Fig. 3 is a fragmentary view similar to Fig. 2 but showing a possible modification of the device of the invention.

Fig. 7 shows a modified form of device embodying the invention.

Figure 4:
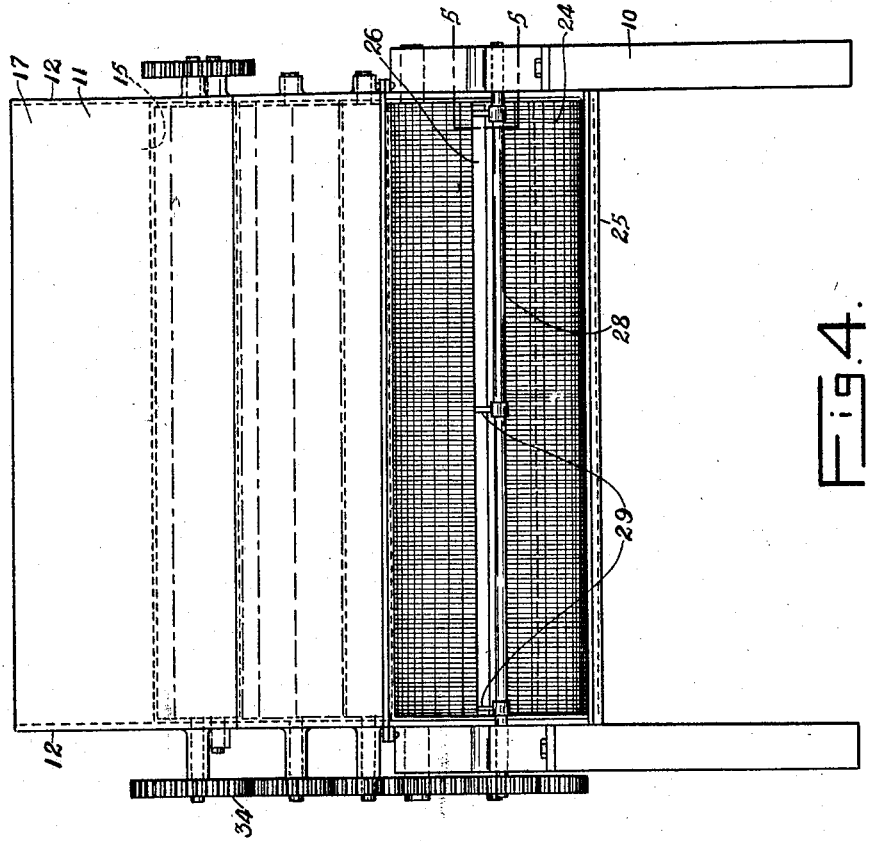
Fig. 4 is a view taken on line 4—4 of Fig. 1.
Figure 5:
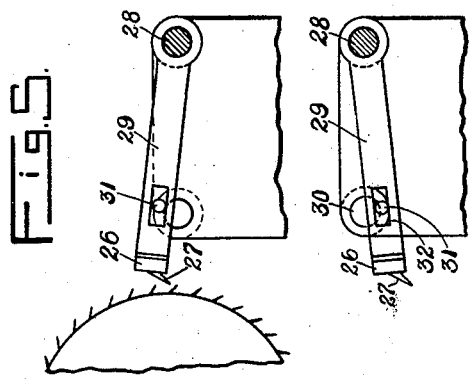
Fig. 5 is a fragmental detail of part of the device in one position.
Figure 6:
Fig. 6 is a view of the same part in another position.

In the manufacture of laps or bats from cotton and other fibrous materials there is commonly used a preparer for separating or loosening the larger masses of the fibers. A feeder device then receives the loosened fibers from the preparer and delivers regulated quantities to the so called Garnett machines which arrange the fibers in sheet like form after which such sheets are folded by other mechanism to provide a layer of cotton batting.

In the device of the present invention the preparer, feeder and Garnett machines are replaced with a simpler combination of elements which performs the same work in a better manner and in less time than is possible with the other machines.

By reference to Fig. 1 it will be noted that a suitable base 10 supports a casing 11 which comprises side walls 12, a front wall 13 and a rear wall 14 which is suitably formed to extend about certain of the rolls of the device. The casing 11, which may be open at its top, has a vertical transverse partition 15 extending between walls 12 and an inclined baffle or flange 16 extending from front wall 13 thereby forming a hopper chamber 17 within the casing. The partition 15 and baffle 16 constitute walls of the chamber or hopper for confining the material to be operated upon or separated. The walls 15 and 16 converge downwardly and upon one another, and if continued, would meet and form an acute angle. As will be noted in Fig. 2 a pair of rolls 18 and 19 close the space between the ends of partition 15 and baffle 16 so that cotton from the bale will remain in hopper chamber 17 so that it may be separated by the rolls 18 and 19. Roll 19 may be termed a picker roll and roll 18 may be termed an agitator roll. The rolls 18 and 19 are provided with rows of sharp spurs or teeth, also referred to as carding points and indicated diagrammatically by the reference numeral 20. The rolls 18 and 19 extend into the hopper at the apex of the converging walls 15 and 16, and substantially one-half of each of those rolls is within the included or acute angle formed by prolongation of said walls. The said walls cooperate with the rolls to preclude escape of material from the hopper, between the lower and closer ends of those walls and the roll adjacent each of those ends, wherefore discharge from the hopper is confined to the area between the adjacent surfaces of the rolls 18 and 19. The rolls 18 and 19 are arranged for rotation in the same direction and the points of spurs or teeth 20 extend in the opposite directions, so that the adjacent sides of said rolls, move relatively in opposite directions.

The pointed ends of the teeth of roll 19 move forwardly into the mass of cotton in the hopper, while the cotton mass slides off the pointed ends of the teeth on roll 18. In other words, the teeth on said rolls function in relatively reverse manner, in one case the points are foremost and in the other case the points are rearmost as they are carried through the fiber mass. This relation of the teeth on the rolls prevents the drawing of large masses of the cotton from the hopper into the rolls so that the roll 19 may efficiently separate the fibers from the mass and deliver them in film-like stream to main cylinder 21 which rotates in the same direction as the rolls 18 and 19. A roll or fancy 22 operates adjacent the circumference of roll 21 but in a direction opposite thereto, so that adjacent teeth 20 on this roll and the cylinder move in the same direction. A roll or stripper 23 which is also provided with teeth 20 cooperates with cylinder 21 and roll 22 for directing the fibers in sheet like arrangement between the cylinder and discharge roll or doffer 24. Discharge roll 24 rotates in a direction opposite to the direction of rotation of cylinder 21 so that the fiber is carried between the lower periphery of the discharge roll and curved bottom 25 of casing 11. A rake or comb 26 provided with a plurality of teeth 27, is mounted for rapid reciprocation adjacent the periphery of discharge roll 24 exteriorly of the casing. The means for vibrating the rake 26 may comprise a shaft 28 upon which are pivotally mounted a plurality of arms 29 which carry the rake 26 at their free ends. A suitable cam 30 may be provided with a pin 31 which extends through a slot 32 in arm 29, rapid rotation of the cam 30 serving to effect rapid reciprocation of the rake 26. The reciprocating rake 26 serves to separate the fiber from discharge roll 24 and to permit it to drop upon a suitable conveyor belt 33.

It will be understood that the device is power actuated and that the direction of rotation of the several rolls and the cylinder may be effected through a suitable gear train indicated generally by the reference character 34. The roll 19 is slightly greater in diameter than roll 18 and therefore has somewhat greater surface speed when the rolls are rotated at substantially uniform speed. This arrangement of rolls makes possible a more thorough separation of the fibers than was heretofore possible with the Garnett machine and preparer. The rates of speed of the rolls are substantially as follows: roll 19 approximately 975 R. P. M.; roll 18 approximately 1175 R. P. M.; roll or cylinder 21 approximately 270 R. P. M.

In Fig. 3 there is shown a possible modified and simplified form of device wherein a roll such as 19, provided with the customary teeth 20 is used in conjunction with a smooth roll 35. This very simple mechanism is effective for thoroughly dividing masses of cotton direct from the bale so that it may be handled by pneumatic means for filling upholstery casings and the like.

From the foregoing it will be noted that the device of this invention occupies a minimum of floor space and that it eliminates the preparer and feeder heretofore used in conjunction with Garnett machines. It will be further noted that the device of the invention performs its work with a lesser number of parts than are found in the Garnett machine and at the same time accomplishes the operations of the entire group of machines with greater efficiency and with greater speed. The increased efficiency is believed to be due to the fact that the action of rolls serves to keep the mass of cotton M in a state of agitation which in effect is equivalent to suspending said mass in contact with the rolls while the fibers are being separated therefrom.

In the operative device produced and embodying the invention disclosed herein, it was found that a six (6) to five (5) speed ratio of the rolls 18 and 19 respectively, disposed one above the other with aligned diameters of the rolls at about 30 degrees to the horizontal gave excellent results in volume and character of product. Roll 19 is rotated preferably at 975 revolutions per minute and roll 18 at 1175 revolutions per minute. In that device the teeth on the rolls extended about the respective rolls in opposite directions.

The rolls 18, 19, impart motion to the mass of material in the direction of the arrows shown above said rolls on the hopper in Fig. 1, for rotating the mass of material in the hopper above said rolls. The mass of material preferably has substantially unconfined rotary movements in said hopper, being urged toward the rolls by gravity, in the exemplification stated. The surface movements of the rolls, urge similar movement upon the mass, which is also deflected away from the roll 18 by the transverse vertical partition 15, the mass continuing in its movement, and the moving surface of the mass being again directed toward the rolls by the front wall 13 and the inclined baffle 16.

The teeth or spurs on the agitator and picker rolls apparently cooperate in the following manner. It is believed that a buoyant action results from the rotation of the mass in the hopper 11, that the agitator roll not only assists the picker roll in revolving the mass but also partly extricates individual fibers from the mass, thereby making it possible for the teeth on the picker roll to subsequently withdraw such loosely held fibers and to deliver the released fibers in a web to the cylinder 21, that functions primarily as a conveyor, or at most as a supplemental carding element. It is believed that fibers, held tightly by the mass can not be removed by the picker roll alone, because the rotating mass tends to carry along any tightly held fibers, rather than that the engagement of fibers securely held to the mass and engaged by the teeth on the picker roll would check the movement of the mass to permit succeeding teeth on the picker roll to engage such securely held fibers to assist in withdrawing the fibers from the mass. This appears to be the gist of the operation, viz any fibers or linters, not sufficiently free from the mass will not detach themselves from the mass, but must move with the mass until adjoining fibers and linters have been withdrawn to release the fibers that were previously secured to the mass and could not be released by the action of single teeth on the picker roll. The product is so well fleeced, that the suggested explanation seems plausible and correct. In other carding or Garnett devices the tendency is to securely hold a little mass of fibers by teeth on one roll and to pull fibers loose from the secured mass by engagement of numerous teeth on an adjoining roll. The difference seems to be that between forcefully pulling fibers from a mass, as practiced in old style machines, and working the mass by repeated engagement of single fibers of an unsecured mass, and directing centrifugal action upon the mass and fibers until the fibers gradually are loosened and are released from the mass and may then be carried away from the hopper by the teeth of the picker roll.

If desired the main cylinder 21 may be employed in connection with an agitator such as 18, and with suitable hopper walls such as 15 and 16, the roll 19 being dispensed with, for attaining results almost as good as can be obtained from the structure shown in Fig. 2.

In the modification shown in Fig. 7, the upper portion of cylinder 70 functions in conjunction with the agitator 71 as does the upper portion of picker 19 cooperate with agitator 18. The loose fibers passing between the cylinder 70 and agitator 71 are in the same state as are those fibers, shown in Fig. 1, that fall upon the cylinder 21. The fancy 72, stripper 73, doffer 74 function in the same manner as do fancy 22, stripper 23 and doffer 24.

What is claimed is:

1. The combination with a carding machine comprising one main cylinder only, one worker only and one stripper only, cooperating for carding fibers, of means for continuously sprinkling fibers in loose condition onto substantially the top of the main cylinder, and in advance of the worker and stripper, and means for removing the fibers from the main cylinder.

2. The combination with a carding machine comprising one main cylinder and means cooperating with the main cylinder for carding fibers, of means for continuously sprinkling fibers in loose condition onto substantially the top of the main cylinder, in advance of the carding means, to provide on the main cylinder a loosely held blanket of disconnected fibers upon which the carding means may operate to produce a batt, and means for removing the resultant batt from the main cylinder.

3. In a device of the class described the combination with a hopper having an open bottom, of a pair of rotatable rolls forming a closure for said bottom, one of said rolls being provided with teeth pointing in the direction of rotation of said roll and both of said rolls being adapted to have the same direction of rotation, said hopper and rolls serving to sustain and tumble a mass of fibrous material so that one of the rolls may pick loosely held fibers from various portions of the mass, a rotating main cylinder spaced from the above mentioned pair of rolls and having teeth pointing in the direction of rotation of the cylinder, a discharge roll rotating in a direction opposite to the direction of rotation of the main cylinder and having teeth pointing in the direction opposite to the direction of rotation of the discharge roll, and an oscillating rake arranged for movement adjacent the periphery of the discharge roll, the first mentioned pair of rolls serving to sprinkle onto the main cylinder the fibers removed thereby from the tumbling mass in the hopper, whereby the fibers are arranged on the main cylinder in loose sheet form, said discharge roll serving to convey the loose fibrous sheet from the main cylinder and to have said sheet separated therefrom through the action of the oscillating rake.

4. In a device of the class described the combination with a hopper having an open bottom, of a pair of rotatable rolls forming a closure for said bottom, one of said rolls being provided with teeth pointing in the direction of rotation of said roll and both of said rolls being adapted to have the same direction of rotation, said hopper and rolls serving to sustain and tumble a mass of fibrous material so that one of the rolls may pick loosely held fibers from various portions of the mass, a rotating main cylinder spaced from the above mentioned pair of rolls and having teeth pointing in the direction of rotation of the cylinder, a discharge roll rotating in a direction opposite to the direction of rotation of the main cylinder and having teeth pointing in the direction opposite to the direction of rotation of the discharge roll, the first mentioned pair of rolls serving to sprinkle onto the main cylinder the fibers removed thereby from the tumbling mass in the hopper, whereby the fibers are arranged on the main cylinder in loose sheet form, said discharge roll serving to convey the loose fibrous sheet from the main cylinder and to have said sheet separated therefrom.

5. In a device of the class described the combination with a hopper having an open bottom, of a pair of rotatable rolls forming a closure for said bottom, one of said rolls being provided with teeth pointing in the direction of rotation of said roll and both of said rolls being adapted to have the same direction of rotation, said hopper and rolls serving to sustain and tumble a mass of fibrous material so that one of the rolls may pick loosely held fibers from various portions of the mass, a rotating main cylinder spaced from the above mentioned pair of rolls and having teeth pointing in the direction of rotation of the cylinder, a discharge roll rotating in a direction opposite to the direction of rotation of the main cylinder and having teeth pointing in the direction opposite to the direction of rotation of the discharge roll, and a picking means adjacent the periphery of the discharge roll, the first mentioned pair of rolls serving to sprinkle onto the main cylinder the fibers removed thereby from the tumbling mass in the hopper, whereby the fibers are arranged on the main cylinder in loose sheet form, said discharge roll serving to convey the loose fibrous sheet from the main cylinder and to have said sheet separated therefrom through the action of the picking means.

In testimony whereof, I have hereunto subscribed my name this 20th day of February, 1930.

ELMER T. WUEST.